(12) United States Patent
Perry

(10) Patent No.: US 12,256,724 B2
(45) Date of Patent: Mar. 25, 2025

(54) SYSTEM FOR DAMAGING AND/OR DESTROYING CROP OF PLANTS, AND RELATED METHODS

(71) Applicant: Morgan Perry, Phoenix, AZ (US)

(72) Inventor: Morgan Perry, Phoenix, AZ (US)

(73) Assignee: STRATUS AERO, LLC, Oro Valley, AZ (US)

( * ) Notice: Subject to any disclaimer, the term of this patent is extended or adjusted under 35 U.S.C. 154(b) by 0 days.

(21) Appl. No.: 17/053,714

(22) PCT Filed: May 13, 2019

(86) PCT No.: PCT/US2019/032041
§ 371 (c)(1),
(2) Date: Nov. 6, 2020

(87) PCT Pub. No.: WO2019/222109
PCT Pub. Date: Nov. 21, 2019

(65) Prior Publication Data
US 2021/0244011 A1    Aug. 12, 2021

Related U.S. Application Data

(60) Provisional application No. 62/673,040, filed on May 17, 2018.

(51) Int. Cl.
*A01M 21/04* (2006.01)
*G06V 10/20* (2022.01)
(Continued)

(52) U.S. Cl.
CPC .......... *A01M 21/04* (2013.01); *A01M 21/046* (2013.01); *G06V 10/255* (2022.01); *G06V 20/188* (2022.01); *G06V 10/58* (2022.01)

(58) Field of Classification Search
CPC ........ A01M 21/046; B64D 1/18; A01B 41/06; G02B 19/0052; G02B 27/09;
(Continued)

(56) References Cited

U.S. PATENT DOCUMENTS 3,619,037 A    11/1971  Pugh
3,652,844 A    3/1972   Scott, Jr.
(Continued)

FOREIGN PATENT DOCUMENTS

CN    204930106 U    1/2016
DE    4039797 A1 *   9/1991   .......... A01M 21/046
(Continued)

OTHER PUBLICATIONS

Coffey, V "High-Energy Lasers: New Advances in Defense Applications" (online publicaiton) OSA; Oct. 2014. (retrieved online: Jul. 15, 2019) <URL: https://www.osa-opn.erg/home/articles/volume_25/Oct.2014/features/high-energy_lasers_new_advances_in_defense_applica/>; p. 2, first full paragraph, last paragraph to p. 3, first paragraph.

(Continued)

*Primary Examiner* — Peter M Poon
*Assistant Examiner* — Danielle A Clerkley
(74) *Attorney, Agent, or Firm* — Wolf IP Law, PLLC; Dean E. Wolf, Esq.

(57) ABSTRACT

A system for targeting and damaging a growing plant includes an aircraft, a laser, and a controller. The laser and controller are mounted to the aircraft, which can position the laser and controller airborne at least 350 meters away from the growing plant to be damaged. The laser can generate a beam of energy sufficient to critically damage the plant when the plant is exposed to the beam and located at least 350 meters away. The controller can determine whether a target of the laser is a plant to be damaged. In response to this (Continued)

determination, the controller can also: a) prevent the laser's beam of energy from reaching the target, if the target is not a plant to be damaged, and b) cause the laser's beam of energy to reach the target, if the target is a plant to be damaged.

24 Claims, 5 Drawing Sheets

(51) Int. Cl.
    *G06V 20/10*    (2022.01)
    *G06V 10/58*    (2022.01)

(58) Field of Classification Search
    CPC ..... H01S 3/0007; H01S 3/005; G06V 20/188; G06V 20/255; G06V 20/58; A01D 75/20; A01D 75/206; A01D 2075/203; B64C 13/16; G05D 1/0055
    USPC ................ 47/1.3, 1.43; 701/10, 14
    See application file for complete search history.

(56) References Cited

U.S. PATENT DOCUMENTS

| | | | |
|---|---|---|---|
| 6,795,568 B1 * | 9/2004 | Christensen | A01M 21/04 250/559.29 |
| 7,506,815 B2 | 3/2009 | Spiegel | |
| 7,875,862 B1 | 1/2011 | Hudson et al. | |
| 7,919,723 B2 * | 4/2011 | Ide | A01D 34/015 219/121.67 |
| 8,666,550 B2 * | 3/2014 | Anderson | B62D 57/032 700/255 |
| 9,565,848 B2 | 2/2017 | Stowe et al. | |
| 10,219,449 B2 * | 3/2019 | Redden | A01G 7/06 |
| 10,292,321 B2 * | 5/2019 | Neitemeier | G06F 18/2411 |
| 10,390,497 B2 * | 8/2019 | Redden | A01M 21/043 |
| 10,548,306 B2 * | 2/2020 | Albert | A01M 7/00 |
| 11,266,140 B2 * | 3/2022 | Kroeger | A01M 21/046 |
| 2015/0075068 A1 | 3/2015 | Stowe et al. | |
| 2016/0205918 A1 | 7/2016 | Chan et al. | |
| 2016/0325127 A1 | 11/2016 | Billman | |
| 2017/0188564 A1 | 7/2017 | Stowe et al. | |

FOREIGN PATENT DOCUMENTS

| | | | | |
|---|---|---|---|---|
| DE | 10258347 | A1 * | 7/2004 | A01D 75/20 |
| DE | 102017113245 | A1 * | 12/2018 | A01B 69/001 |
| EP | 3183950 | A1 * | 6/2017 | A01D 75/20 |

OTHER PUBLICATIONS

Rubenchik, A. M., et al. Environmentally Clean Mitigation of Undesirable Plant Life Using Lasers. No. LLNL-TR-414879. Lawrence Livermore National Lab.(LLNL), Livermore, CA (United States), 2009. (retrieved online: Feb. 11, 2021) <URL: https://www.researchgate.net/profile/Alexander_Rubenchik2/ publication/ 255209611 Environmentally_Clean Mitigation of Undesirable Plant_ Life_Using_Lasers/links/5432a9b30cf225bddcc7c3f4.pdf>.

* cited by examiner

SYSTEM FOR DAMAGING AND/OR DESTROYING CROP OF PLANTS, AND RELATED METHODS

CROSS REFERENCE TO RELATED APPLICATION AND CLAIM OF PRIORITY

This application claims priority from commonly owned U.S. Provisional patent Application 62/673,040 filed 17 May 2018, and titled "System and Method for Reducing Illicit Crop Yield from Distance Using Airborne Energy Beam", presently pending and incorporated by reference.

BACKGROUND

There are many different ways of destroying crops of plants that are harvested to produce an illicit drug. For example, a group of people (typically law enforcement troops of the country where the crop is growing) physically take possession of the area where the crops are growing and physically destroy the crops by burning, uprooting, and/or prematurely harvesting the plants. Unfortunately, the people growing the crops often attempt to prevent these troops from destroying their crops by opposing the troops with force. This exposes the law enforcement troops to serious bodily harm and often death.

To overcome this problem, many law enforcement agencies attempt to destroy the crops by exposing the crops to a chemical herbicide or fire, which they can apply or start remotely. For example, one can fly over a crop of such plants and spray a chemical herbicide onto the plants. Although this reduces the number of law enforcement troops exposed to danger during crop destruction, the plane spraying the crops must fly low and close to the crops to affectively apply the chemical herbicide to the crops and to limit the exposure of other plants and animals to the herbicide. Even so, some of the herbicide will find its way into nearby water and animals, and cause more damage. For another example, one can ignite a crop of such plants by dropping an incendiary device onto a field of the crops. Although this can be done with limited exposure of law enforcement troops to danger, it can be difficult to control the fire once it's started. The growers may be able to put out the fire before much of their crops can be destroyed, or the fire could get out of control and destroy areas beyond the crops.

Thus, there is a need for a system that can damage and/or destroy a crop of plants while minimizing one's exposure to hostile action from a grower and while minimizing collateral damage to the surrounding area and animals.

SUMMARY

In an aspect of the invention, a system for targeting and damaging a growing plant includes an aircraft, a laser, and a controller. The laser and controller are mounted to the aircraft, which can position the laser and controller airborne at least 350 meters away from the growing plant to be damaged. The laser can generate a beam of energy sufficient to critically damage the plant when the plant is exposed to the beam. The controller can determine whether a target of the laser is a plant to be damaged. In response to this determination, the controller can also: a) prevent the laser's beam of energy from reaching the target, if the target is not a plant to be damaged, and b) cause the laser's beam of energy to reach the target, if the target is a plant to be damaged.

With the system's laser one can target and damage a plant, such as a poppy, or a crop of plants, from a location that is close enough to the plant to ensure that the target is a plant to be damaged, yet far enough away from the plant to mitigate the laser's exposure to hostile action from a person trying to protect the plant or crop of plants. With the system's aircraft, one can make the system's laser very mobile and thus further reduce the exposure of the laser to hostile action. When the aircraft is a manned aircraft, such as an airplane or helicopter flown by an onboard pilot, such mobility also helps mitigate the pilot's exposure to hostile action from a person trying to protect the plant or crop of plants. And finally, with the system's controller, one can control in real time the beam of energy generated by the laser to ensure that the target(s) of the laser are the plants to be damaged, not other plants, animals, people, vehicles nor structures. In this manner, the system for targeting and damaging growing plants does not generate unwanted collateral damage.

In another aspect of the invention, a method for targeting and damaging a growing plant includes positioning a laser of a system at least 350 meters away from an area of growing plants; identifying a target, within the area, to be exposed to a beam of energy generated by the laser; and determining, with a controller of the system, whether the target is a plant to be damaged. If the target is a plant to be damaged, then the method also includes the system's laser generating a beam of energy such that the plant is exposed to an amount of energy sufficient to damage the plant. If the target is not a plant to be damaged, then the method also includes the system's controller preventing the laser's beam of energy from reaching the target.

DETAILED DESCRIPTION

Figure 1:
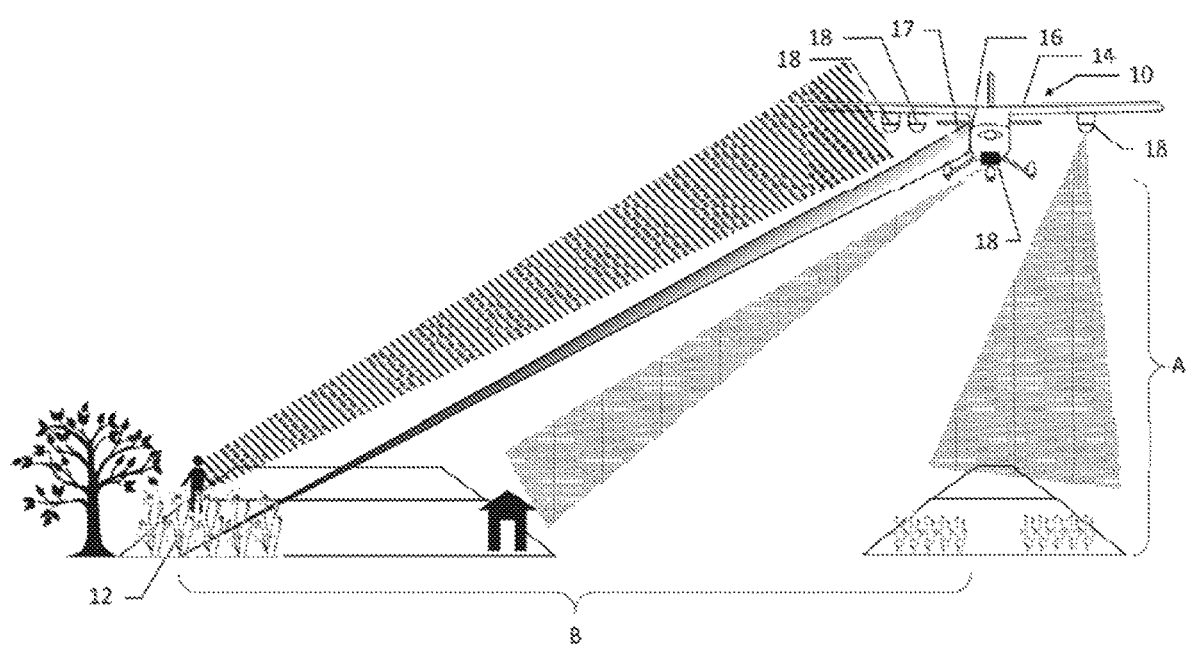
FIG. 1 shows a view of a system for targeting and damaging a growing plant, according to an embodiment of the invention.

FIG. 1 shows a view of a system 10 for targeting and damaging a growing plant according to an embodiment of the invention. The system 10 may be used to target and damage a single plant 12 and/or a crop of plants 12 (shown here) growing in an area. The growing plant 12 targeted for damage may be any desired plant. For example, here the plant 12 is a poppy that is grown and harvested to obtain opium, and although the system 10 is discussed as being used to damage such poppies 12, the system 10 may be used to target and damage any other plant capable of producing an illicit drug as well as other plants that are simply unwanted in a given area.

The system 10 includes an aircraft 14, a laser 16 (discussed in greater detail in conjunction with FIGS. 2 and 3) mounted to the aircraft 14, and a controller (discussed in greater detail in conjunction with FIGS. 2 and 3) also mounted to the aircraft 14. The aircraft 14 positions the laser 16 and controller at least 350 meters away from the crop of opium poppies 12, and may be any aircraft capable of performing this function. Here the aircraft 14 is an airplane controlled by an on-board pilot. In other embodiments, the aircraft 14 may be a balloon, helicopter or an unmanned drone. The laser 16 can generate a beam of energy 17 sufficient to critically damage the poppies 12 in the area from at least 350 meters away, and when aimed and fired at the poppies 12 causes the poppies 12 or portion of the poppies 12 to be exposed to the energy in the generated beam 17. The damage to the opium poppy 12 caused by the beam's energy may be sufficient to kill the poppy's seed pod instantly or more slowly such as within several days, prevent the maturation of the seed pod, or substantially increase the time it takes for the seed pod to mature. Although any part of the poppy 12 may be exposed to the laser's beam 17, exposing the stem of the poppy 12 to the beam 17 is an efficient way to damage the poppy's seed pod because much of the nutrients for the seed pod's development flows through the poppy's stem. The controller includes a sensor 18 (here five different ones, each discussed in greater detail in conjunction with FIGS. 2 and 3) and can identify targets in the area where the opium poppies 12 grow and determine whether the target is a poppy 12 to be damaged. Then, based on this determination, the controller can either cause the poppy 12 to be exposed to the laser's beam, or prevent the target from being exposed to the laser's beam 17.

With the system's laser 16 one can target and damage a crop of opium poppies 12 from a location that is close enough to the poppies 12 to ensure that the targeted plant 12 to be damaged is an opium poppy 12, yet far enough away from the poppy 12 to mitigate the laser's exposure, and thus any on-board personnel's exposure, to hostile action from a person trying to protect the crop of poppies 12. With the system's aircraft 14, one can make the system's laser 16, and thus the on-board pilot, very mobile, and thus further reduce the exposure of both to hostile action. And finally, with the system's controller, one can control in real time the energy beam 17 generated by the laser 16 to ensure that the target(s) of the laser 16 are the opium poppies 12, not other plants, animals, people, vehicles and/or structures. In this manner, the system 10 for targeting and damaging the growing opium poppies 12 does not generate unwanted collateral damage.

In operation, the system 10 may be flown in a pattern, typically circular or nearly so, around the target area with a vertical distance (A in FIG. 1) and a horizontal distance (B in FIG. 1) set by the needs of the specific implementation, balancing needs for safety and efficacy. Because these two objectives generally run counter to each other, desired vertical and horizontal distances A and B, respectively, may be determined on a case-by-case basis. Factors to consider when determining the vertical and horizontal distances include type of plant 12 to be damaged, whether the system 10 is likely to encounter hostile actions, the speed at which the system 10 can damage the crop of plants 12 in an area, which depends on the system's laser 16 and the size and terrain of the area where the plants 12 grow.

If hostile action is not expected, the flight radius around the target area may be small, and an aircraft suited to safe slow flight may be used. For example, a fixed-wing aircraft with slow-flight capabilities (e.g., 45 knots or less), a lighter-than-air aircraft, or a rotor-wing can be used, and positioned along a flight path that is described by a ratio of the horizontal distance B to vertical distance A of 2:1 to 4:1. The ratio described by the flight path could be larger especially for a system 10 that includes a tethered airborne platform. These ratios allow each pass of the laser beam 17 to cross many stems without being unduly impeded by other vegetation, such as leaves and neighboring crops or trees, and also allow the laser beam 17 to terminate on the ground of the target area, not beyond or outside of the target area. Being closer to the targeted opium poppies 12 also allows for less divergence or scattering of the energy beam 17, and thus more energy of the energy beam 17 may be transferred to the targeted plants 12.

If hostile action is expected, however, then the horizontal distance B or vertical distance A defining the flight path may be much greater than that discussed above. For example, a minimum horizontal distance to the opium poppies 12 may be 350 meters to greatly reduce the effectiveness of an AK-47 being fired at the system 10, with this horizontal distance B, one can then establish the vertical distance A using one of the ratios discussed above. With the increase in distance between the laser 16 and the targeted pants 12 to be damaged, the laser 16 will have to generate a laser beam 17 that can travel a distance and contain enough energy when the beam hits the opium poppy 12 to damage the poppy 12. An embodiment of such a system 10 may include a laser 16 that generates an energy beam 16 having a short wavelength and enough power to span a distance defined by 5,000 meters or more in the horizontal direction and 3,500 meters or more in the vertical direction.

Figure 2:
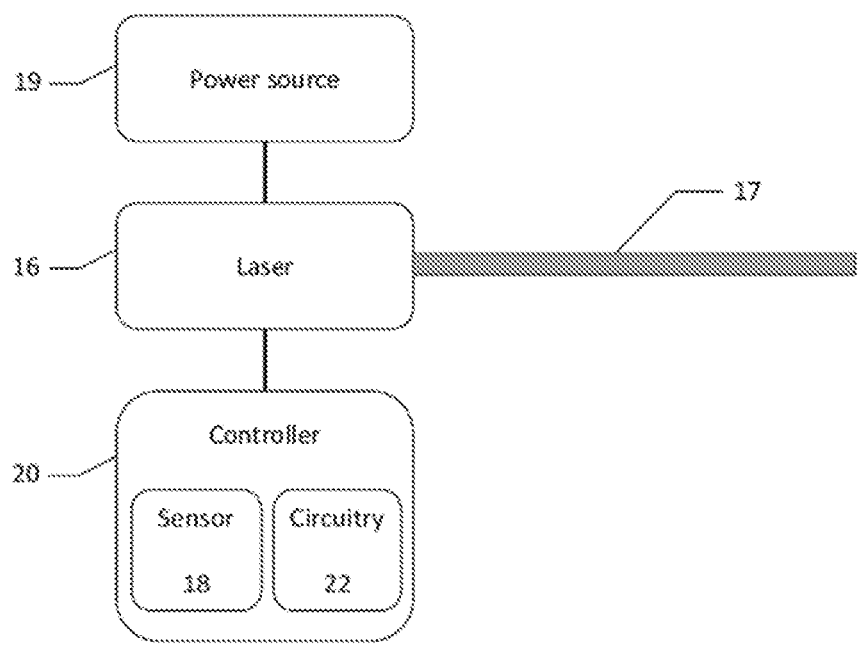
FIG. 2 shows a schematic view of a portion of the system shown in FIG. 1, according to an embodiment of the invention.

The operational speed of the system 10 (e.g., acres treated per hour) depends on numerous factors, including the wavelength, type, power and quality of the laser 16, which is discussed in greater detail in conjunction with FIG. 2. Here, an embodiment of the system 10 includes a laser 16 that is a fiber laser stacked to generate an energy beam 17 having a wavelength of 532 nanometers (nm), a low M-squared parameter, and several tens of kilowatts (kW) of power (a measure of the beam's energy). Such an energy beam 17 can effectively damage several acres of opium poppies 12 to several tens of acres of poppies 12 per hour from a distance of 800-1600 meters from target and 300-600 meters above ground.

Still referring to FIG. 1, the components of the system 10 may be mounted to the aircraft 14 as desired, and may include components in addition to the laser 16 and controller. For example, in this and other embodiments, the laser 16 and controller may be mounted within the aircraft's airframe, and the system 10 may also include a high-capacity generator (not shown) to generate electric power for the laser 16, a chiller/cooling/heat dissipation unit (also not shown) to help keep the laser 16 and controller cool during operation, an auxiliary power unit (APU) (also not shown) to provide power to the system 10 and specifically to the high-capacity generator, and armor (also not shown) to protect the system 10 and person(s) in the aircraft 14 from damage from hostile fire. The armor may extend or cover as much or as little of the aircraft 14 as desired. In this and other embodiments, the aircraft 14 of the system 10 is configured to hold two people—a pilot to fly the aircraft 14 and a technician to monitor and operate the laser 16 and other components of the system 10. In other embodiments, the pilot may also monitor and operate the laser 10 and other components of the system. In still other embodiments, the pilot may fly the aircraft 14 while a technician located remotely from the aircraft 14 monitors and operates the laser 16 and other components of the system 10.

Other embodiments are possible. For example, the system 10 may include land-to-air missile countermeasures and systems such as chaff and flares to provide additional protection in an extremely hostile environment. For another example, the system 10 may include an aircraft 14 that may be modified to not only damage targeted plants 12, but to also respond to other threats by using the laser 16 against the other threats. For example, if the system 10 is operating with other systems 10 in the vicinity, each of the systems 10 may be programmed to share threat data and combine and coordinate in response, raising the overall level of safety for the system 10 and crew. In such a situation, the aircraft 14 could retreat to greater distances and/or circle the threat alone or with other systems 10 to ensure multiple attack angles on the ground threat.

FIG. 2 shows a schematic view of a portion of the system 10 shown in FIG. 1, according to an embodiment of the invention.

The laser 16 may be any desired laser or combination of lasers capable of generating such an energy beam 17, and the beam 17 may be any desired beam 17 that has a sufficient amount of energy to damage a specific plant 12 (here a crop of opium poppies) during a specific operation. Because damage to the plant 12 is caused by the energy in the beam 17, the laser 16 should generate a beam 17 having a wavelength that will facilitate the opium poppy's absorption of energy from the beam 17, and an amount of energy that will be transferred to the poppy for the period that the poppy 12 is exposed to the beam 17 to sufficiently damage it.

Opium poppy plants, for example, have absorption peaks at wavelengths of 350-475 nm, around 670 nm, around 1470 nm, and around 1950 nm, which make these wavelengths desirable for damaging opium poppies 12. Within these choices, 670 nm may be selected because it is visible. If stealthy operation of the system 10 is desired during the day when the poppies absorb sunlight for growth, then a light beam 17 having a wavelength of 670 nm would be hard to detect in the day and hard to protect against because to block it would involve also blocking sunlight. Wavelengths of 1470 and 1950 nm may be selected because they penetrate deeper into the vegetation (as may be more appropriate for more dense coca plants) and because they are not quick to damage an animal's eye. A wavelength in the range of 380-400 may be selected because it diverges less in the atmosphere allowing for a more focused beam on a target from farther away, and scatters less in a high, hot and arid environment.

The amount of energy required to lethally overheat or otherwise critically metabolically damage the stem of an opium poppy 12 is about 1-4 Joules/mm2 (J/mm2). A typical stem of an opium poppy 12 that produces a seed pod, has a diameter of about 0.4-0.8 centimeters (cm). Assuming a 1 mm high energy beam 17 at the opium poppy 12, this equates to a typical lased cross-sectional area of about 4-8 mm2. So, the total amount of energy typically required to lethally overheat or otherwise critically metabolically damage a cross section of a single stem of an opium poppy is about 4-32 J. One watt (VW) equals one J/sec. So, if a critically damaging dose of energy is to be provided to the opium poppy 12 by exposing it to the energy beam 17 over a period of one one-thousandth of a second, then the laser 16 should output 4-32 kW of power. These numbers are calculated for an energy beam 17 that will hit a single stem at an angle perpendicular to the stem. The more stems that will be exposed to the beam 17, then the correspondingly greater the amount of energy that must be in the energy beam 17 to sufficiently damage the opium poppies 12. Similarly, the quicker the period during which a stem is exposed to the energy beam 17, then the correspondingly greater the amount of energy that must be in the energy beam 17 to sufficiently damage the opium poppy 12. Also, as the energy beam 17 hits the stem progressively more obliquely, then increasingly greater amounts of energy must be transferred to critically damage the poppy 12.

In this and other embodiments, the laser 16 generates a beam of light 17 having a wavelength of 532 nanometers (nm), a low M-squared parameter, and several kilowatts (kW) of power. Such a light beam 17 can effectively damage several acres of opium poppies 12 to several tens of acres or poppies 12 per hour from a distance of 800-1600 meters from target and 300-600 meters above ground.

Other embodiments are possible. For example, the laser 16 may generate a pulsed energy beam having a wavelength of 380 nm, a low M-squared parameter, and 450 W of power. For another example, the laser 16 may generate a continuous energy beam having a wavelength of 1070 nm (near infrared), a low M-squared parameter, and 30 kilowatts (kW) of power. For greater stealth and potentially greater safety from ground threats, the system 10 can be used at night and the laser 16 can generate an energy beam 17 having a non-visible wavelength. For less stealth and/or for more operating time per day the system 10 can be used day and night, and the laser 16 can generate an energy beam 17 having a wavelength in the visible and/or non-visible range of the electro-magnetic spectrum.

Still referring to FIG. 2, the laser 16 may include an optical component (not shown) to shape the energy beam 17 generated by the laser 16 before the beam 17 reaches the opium poppies 12. The optic may shape the beam 17 into any desired shape. For example, the laser's optic may focus the beam 17 into an area at the target that is less than the cross-sectional area of the beam when it's generated by the laser 16. This concentrates the energy in the beam 17 into a small target area, which can decrease the amount of time required for the opium poppy 12 to absorb a critically damaging dose of energy to prevent or reduce opium production.

For another example, the optic may focus the beam 17 generated by the laser 16 in a single dimension. More specifically, the optic may focus the laser beam 17 in the vertical or near vertical direction. Given that the opium poppy stems are generally vertical, the target area may be treated using numerous continuous, quasi-continuous, and/or broken obliquely horizontal beam paths across the target area until the plants 12 in the target area are treated adequately. A beam 17 that is moving horizontally at several meters per second or more through the target area need not be tightly focused in the horizontal dimension as several centimeters or even meters of the beam 17 width will cross the same area on the crop within a very short period (e.g., several milliseconds). This allows similar effectiveness but less cost, complexity, and weight on the system's aircraft 14 compared to a small circular energy beam 17 that is tightly focused in both horizontal and vertical directions. Such an approach may also allow for use of laser 16 that spreads more (e.g., are lower quality) in one axis than in another, such as a diode bar. Such an approach also allows for a laser exit lens and/or aperture to be relatively narrow, such as only a few centimeters wide, while being relatively tall, such as several hundred centimeters, and focusing the beam waist at the target down to as little as a few millimeters to a few tenths of millimeter in height. In the case of large aircraft 14 and/or in the case of affixing or suspending or extending the focusing system outside the aircraft 14, especially an aircraft 14 that can remain airborne with low or negligible forward speed through the air, the laser exit lens could be extended vertically to many times the above-cited length, allowing for increased effectiveness through tighter focusing of the laser beam 17 at target and/or greater distances between the laser 16 and target without sacrificing effectiveness. In general, the larger the exit lens, the longer the range and/or the greater the ability to focus the beam 17 to increase flux density and exposure rate.

In other embodiments, the optic may be programmable and have a variable-focal-length with stabilization and rotatable/gimbaled mounting. With such an optic, the shape of the energy beam 17 generated by the laser 16 may be modified during operation of the system 10 to adapt to changes in operations and/or the environment.

Still referring to FIG. 2, the system 10 includes a power source 19 to provide the laser enough power to generate the desired energy beam 17. The power source 19 may be any desired power source capable of performing this function. For example, in this and other embodiments, the power source 19 is a generator that converts mechanical energy, such as in the form of a rotating shaft, into electricity. The generator may be coupled to the aircraft's engine or to an APU. In other embodiments, the power source 19 may include a storage device such as a battery.

Still referring to FIG. 2, the controller 20 identifies targets in an area for the laser 16, and determines whether the targets are an opium poppy 12 to be damaged, or some other object, such as a person or a shed (shown in FIG. 1). Then, based on this determination, the controller 20 either causes the target to be exposed to the laser's energy beam 17, or prevents the target from being exposed to the laser's beam 17. To accomplish this the controller 20 includes circuitry 22 to control the operation of the laser 16, and a sensor 18 to sense a signal from the target and transmit to the circuitry data that represents the sensed signal. The controller's circuitry then compares the data transmitted from the sensor with data that represents other, known objects to determine whether the target should be exposed to the laser's energy beam 17.

The sensor 18 may be any desired sensor capable of sensing a signal from an object and transmitting to the control circuitry data that represents the signal. For example, in this and other embodiments, the controller 20 includes five different sensors 18—a thermal imaging camera, a hyperspectral or multi-spectral camera, a visible light camera, a precision locating instrument, and a sensor for sensing the shape of an object. The thermal imaging camera senses infrared radiation and is used to help identify whether an object is an animal by the detecting the object's heat signature. The hyperspectral or multispectral camera emits and senses radiation in many different regions of the electromagnetic spectrum that an object emits or reflects, and is used to distinguish various types of vegetation and their stages of growth. This information can be used to identify and/or confirm that a plant is an opium poppy 12 or some other type of plant. This information can also be used to determine whether a targeted object is metallic like the roof of the shed in FIG. 1. The precision locating instrument may be a Wide Area Augmentation System (WAAS)-enabled Global Positioning System (GPS) instrument that provides precise, frequent, and coordinated location information about the position of the target plant 12, the laser 16, and the areas being sensed by the other sensors. The visible light camera senses radiation in the range of wavelengths that the human eye can perceive and allows a person to see the target to help determine whether the target should be exposed to the laser's beam 17. And, the sensor that senses the shape of an object may be a LiDAR (Light Detection And Ranging) instrument that measures distance to a target by illuminating the target with pulsed laser light and then measuring the reflected pulses with a sensor or sensors. Differences in laser light return times, intensities, and wavelengths can then be used to make digital 3-D representations of the target, notably identifying artificial structures and objects such as buildings and vehicles. In addition to these sensors 18 the system 10 may include a global positioning sensor to allow the controller 20 to determine the location of the object and provide another means for determining whether the object should be exposed to the laser's light beam 17. The controller 20 typically uses the data transmitted by each of the sensors in conjunction with the other data transmitted by the other sensors 18 to determine whether the target should be exposed to the laser's energy beam 17. The controller 20 and its sensors 18 may also be used before an actual operation with the system 10, such as a day or more, to help locate areas where opium poppies 12 are growing. Then, a plan for using the system 10 can be developed and executed. In other embodiments the controller 20 may use fewer or more sensors 18 and may use their respective transmitted data alone or with fewer than all of the other transmitted data to determine whether the target should be exposed to the laser's energy beam 17.

With the sensors 18 of the controller 20, the system 10 can operate in the open with an expected 100% on-target-area rate with an expected 0% rate on human or animal heat signatures or structures within the target area. Sufficient safety margins around the perimeter of the target area and around human and animal heat signatures and structures will prevent unwanted exposure to the laser's energy beam 17 prior to the beam 17 straying into these non-target areas, even if the aircraft hits turbulence, the targeting system is otherwise disturbed, or sensor 18 data is lost. In addition to the sensors being used to identifying targets, the sensors may also be used to validate and/or confirm the overall success of the system's operation on a crop of opium poppies 12.

The controller 20 may cause the target to be exposed to the laser's energy beam 17, or prevent the target from being exposed to the laser's energy beam 17 in any desired manner. For example, in this and other embodiments, when the controller 20 determines that the target is to be exposed to the laser's energy beam 17, then the controller 20 aims the laser 16 at the target and directs the laser 16 to generate an energy beam 17. The controller 20 may aim the laser 16 so that beam 17 that it generates hits the stem of the targeted opium poppy 12 for a period and then directs the laser 16 to stop generating the energy beam 17 before aiming the laser 16 at the next targeted opium poppy 12. In other embodiments, the controller 20 can quickly aim the laser 16 at the next targeted opium poppy 12 while continuing to direct the laser 16 to generate the energy beam 17. When the controller 20 determines that the target is not to be exposed to the laser's energy beam 17, the controller 20 may direct the laser 16 to not generate or stop generating the beam 17. In other embodiments, the controller 20 can simply block the beam 17 from reaching the target by positioning a filter or barrier between the laser 16 and the target. Alternatively, the controller 20 may simply change the shape of the beam 17 with an optical component such that the beam 17 is diffused or scattered such that any portion of the beam 17 that does reach the object has very little energy and thus won't damage the object.

Figure 3:
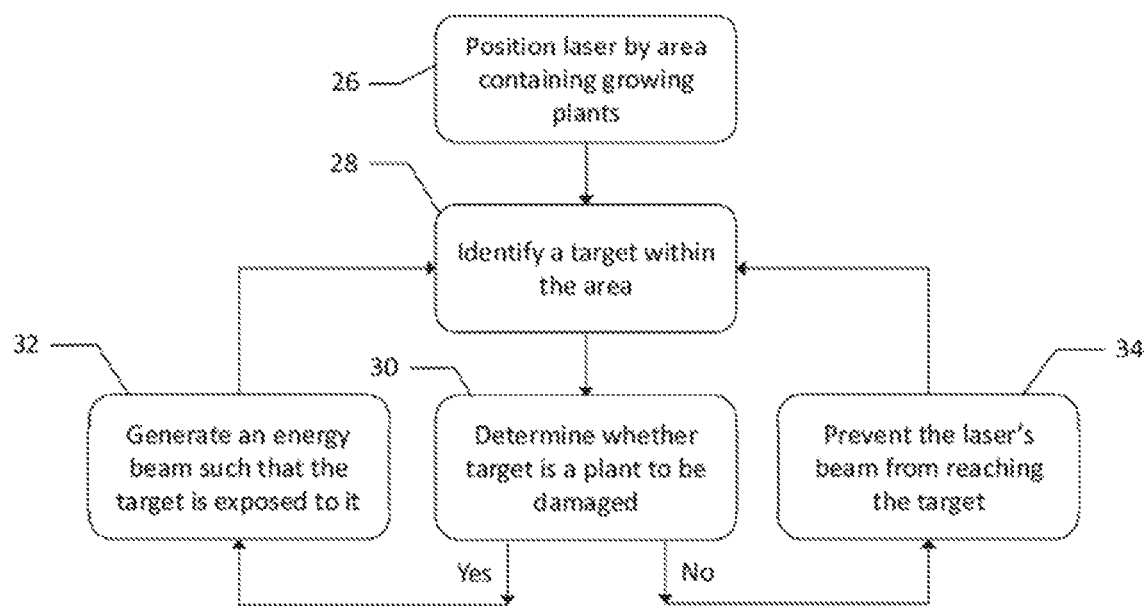
FIG. 3 shows a flow-chart illustrating an operation of the system shown in FIG. 1, according to an embodiment of the invention.

FIG. 3 shows a flow-chart illustrating an operation of the system 10 shown in FIG. 1, according to an embodiment of the invention.

In this and other embodiments, the first step 26 to operating the system 10 (FIG. 1) is to position the system 10 at least 350 meters away from the area that contains growing opium poppies 12 to be damaged. Here, as previously discussed, an aircraft 14 of the system 10 is flown in a pre-determined flight path a substantial distance from the area. Next, in step 28, the controller 20 identifies a target within the area, as previously discussed. Then, in step 30, the controller determines whether the target is an opium poppy 12 (FIG. 1), as previously discussed. If the controller 20 determines that the target is an opium poppy 12, then at step 32, the controller 20 aims the laser 16 at the poppy 12 and directs the laser 16 (FIGS. 1 and 2) to generate an energy beam 17 (FIGS. 1 and 2). In this manner, the opium poppy 12 is exposed to the laser's beam 17. If the controller 20 determines that the target is not an opium poppy 12, then at step 34, the controller 20 prevents the laser's beam 17 from reaching the target, as previously discussed. While either exposing the opium poppy 12 to the beam 17 for a period or preventing the beam 17 from reaching the target, the controller 20, at step 28 again, identifies another target in the area and proceeds to determine whether this other target is an opium poppy 12. After either exposing the first plant 12 for the period or preventing the beam 17 from reaching the target, the controller 20 then proceeds to either step 32 or step 34, again, depending on whether the target is an opium poppy 12.

In one embodiment, the apparatus may be flown in a pattern, such as circular or nearly so, around the target area with the vertical distance (A) and the horizontal distance (B) set by the needs of the specific implementation. Particularly when the flight radius around the target area is small, an aircraft suited to safe slow flight is preferable due to the relatively small radius flight pattern; a fixed-wing aircraft with slow-flight capabilities (e.g., 45 knots or less) or a lighter-than-air aircraft is preferable in this case for efficiency, but a rotor-wing or other aircraft may also be effective. The apparatus may be affixed to the aircraft and/or affixed outside of the aircraft and/or suspended from the aircraft. Ignoring hostile action from those interested in the value of the crop yield, a specific ratio of horizontal distance to vertical distance—perhaps in the vicinity of 2:1 to 4:1, or larger especially for a tethered (either to a fixed or moving ground base) airborne platform embodiment of the apparatus—may prove ideal for allowing each pass of the laser beam to cross many stems without it also being impeded by other vegetation such as leaves and neighboring crops or trees and yet still terminating in the ground of the target area rather than continuing off target horizontally. Similarly ignoring hostile actions, being closer to the target site is generally preferred as it allows for less scattering of the beam, less divergence of the beam and therefore more opportunity to transfer efficient and concentrated energy/radiation to a small area of the target plants. However, hostile action is anticipated and safety is increased for the apparatus and any airborne operators of the apparatus by increasing distances of the apparatus to the target and vertically between the apparatus and the ground, and therefore distances to hostile entities on land.

These two objectives—increased effectiveness and increased operator/apparatus safety from land-based threats—generally run counter to each other and preferred horizontal and vertical distances have to be determined on a case-by-case basis. Small arms fire is the most prevalent and likely means of hostile action against the apparatus and the AK-47 is (one of if not) the most produced and popular small arms in the world with an effective firing range of approximately 350 meters (on level ground), less upward. This establishes an approximate lower-end distance to target from which the apparatus may likely operate in hostile areas, with the ratio between horizontal distance and vertical distance being selected based on the specific implementation as described above. The upper distance limit is based largely on laser wavelength, laser quality, and size and cost of the specific implementation of the apparatus, as greater distance is generally associated with greater safety from hostile action. An embodiment of the apparatus using a larger aircraft and a short-wavelength, high-quality laser with lesser concern for operating costs may be as far away from the target area as 5,000 meters or more and as high above ground as 3,500 meters or more. Greater distances require greater air traffic control authorizations and restrictions and considerations as the energy beam is passing through greater distances and more airspace.

Figure 4:
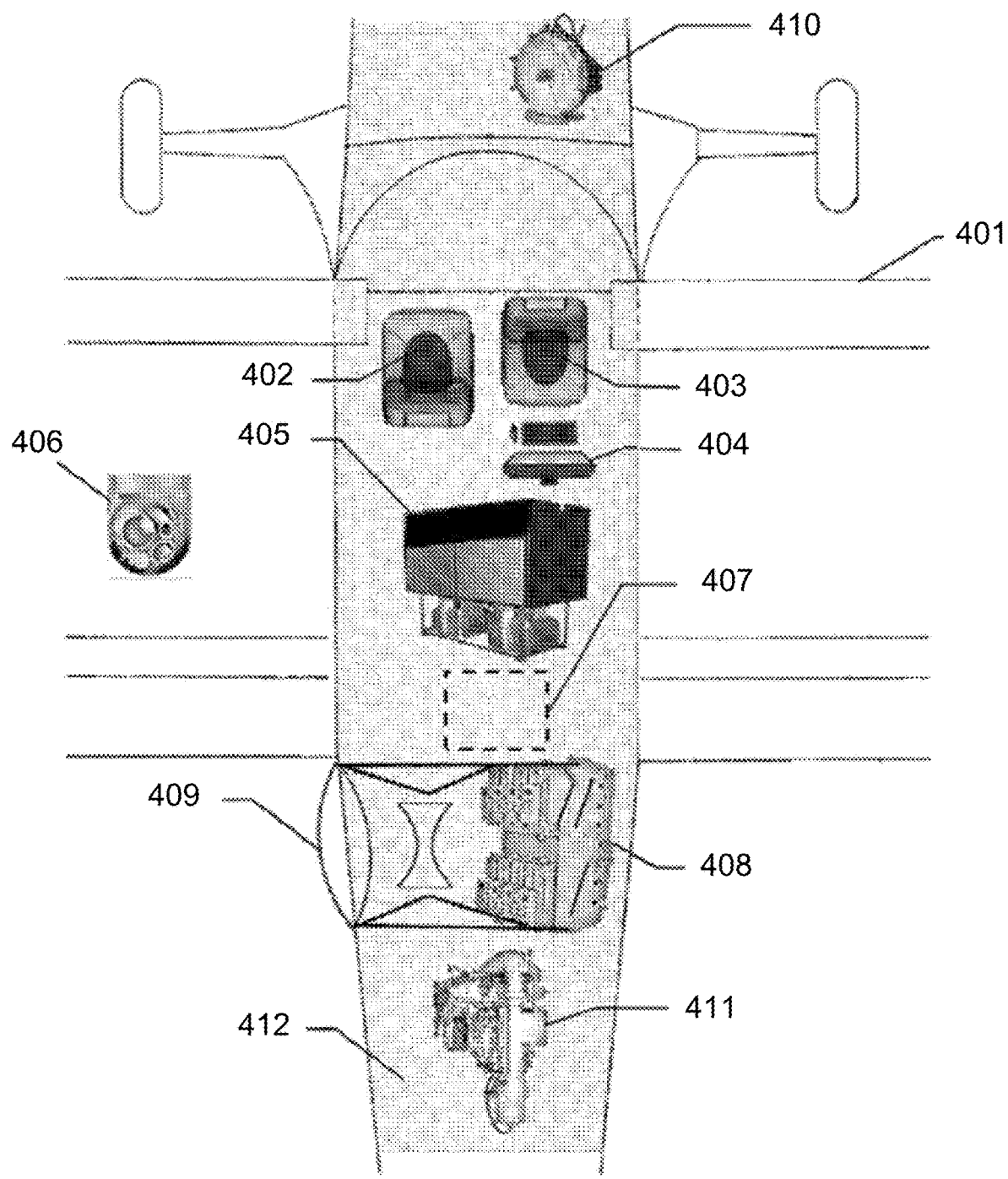
FIG. 4 shows components and optional components of one example embodiment of the apparatus as may be arranged in an aircraft.

FIG. 4 shows components and optional components of one example embodiment of the apparatus as may be arranged in an aircraft. Safety sensors such as FLIR (406) and LiDAR (407) may be deployed on the outside of the aircraft, for example, under the wing and under the fuselage respectively. An airborne pilot station (402) and a technician station (403) for manned aircraft embodiments with technical control system and interface and data recorder (404) are shown in the flight deck of the aircraft. A high-capacity generator (410) is shown forward of the firewall and a chiller/cooling/heat dissipation unit or refrigerant (405), laser source (408), a programmable and variable-focal-length targeting lens system with stabilization and rotatable/gimbaled mounting (409), an APU (411), and ballistic armoring (412) in and around the cabin area. Various embodiments of the apparatus may have system locations different from what is depicted in FIG. 4. For example, the APU may be located in another compartment, such as a compartment beneath the cabin; or the FLIR sensor may be located under the fuselage instead of under a wing; or the targeting system may be aiming out the other side or front of the aircraft; or the ballistic armoring may cover more or less of the aircraft or different areas, etc. Similarly, various embodiments of the apparatus may have fewer or more of some of these components. For example, the technician station and control interface and/or the pilot station may be remote from the aircraft and those functions may be handled remotely and instructions transmitted to the aircraft apparatus, such as an embodiment of the apparatus on a UAV; or the technical and pilot stations may be merged into a single station and operated by a single person; or an APU may not be needed or more than one may be employed; or multiple generators may be employed such as a second generator connected to the APU; or the LiDAR system may be considered unnecessary for a given implementation; or multiple lasers and/or targeting systems may be used. The apparatus may be deeply integrated with the aircraft—for example with GPS, autopilot, power systems, laser beam aircraft exit opening, cooling system, etc.—such that the aircraft would not qualify for standard or normal category airworthiness but would have to be operated in a special, experimental, restricted, public-use or other non-standard category. Or it may be self-contained to the point that normal airworthiness is not affected and the apparatus includes a power source and/or fuel supply separate from that of the aircraft.

Figure 5:
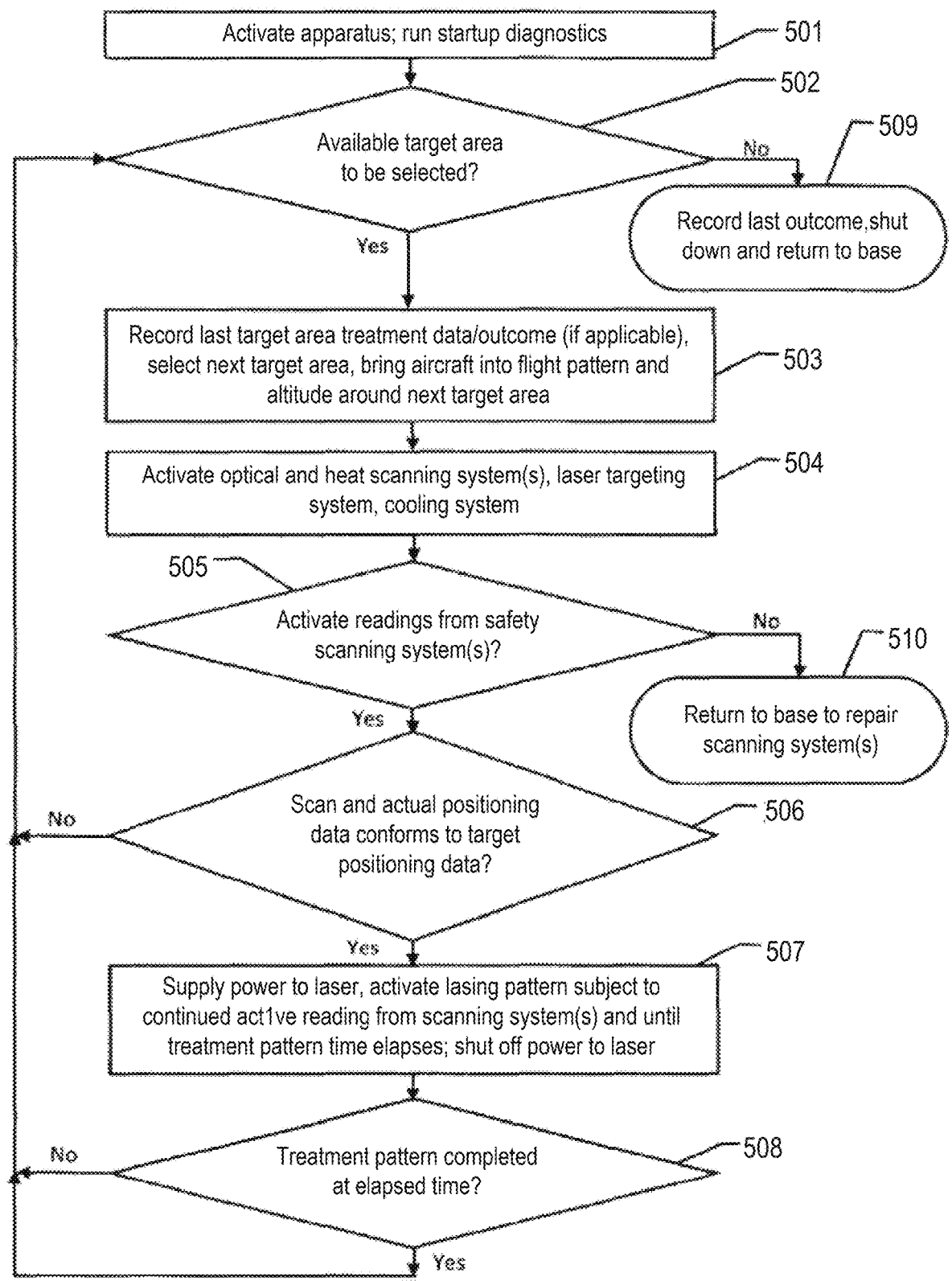
FIG. 5 provides a one example embodiment of a flow chart process for activating and operating the apparatus.

FIG. 5 provides one example embodiment of a flow chart process for activating and operating the apparatus. Before use, the apparatus is started and run through a system diagnostic (501). Then a target area is selected based on an efficient or appropriate target sequence (502). Once the next target area is selected, the apparatus aircraft is flown to a designated flight pattern around the target area (505), the scanning systems and laser targeting systems and cooling systems may be brought on line (504). The apparatus then confirms active and acceptable readings or not from the safety scanning systems (505) and confirm that the scanned target data and actual position data are consistent or not with the target data from the target database (506) to ensure only the appropriate land area is lased. Only after these several safety measures are taken is power supplied to the laser and is the laser activated on its pattern on the target area for a prescribed duration (507) according to the target area size, the laser scanning speed, distance and elevation, and other system factors. Upon passage of an allocated time for a given contiguous target area, the laser power is shut off and the control system determines if the lasing was competed as expected for the target area (508) and records data from the lasing of the target area and moves on to the next target area (502 and 503).

The speed of operation of the apparatus (e.g., acres treated per hour) depends on numerous factors, including the wavelength, type, power and quality of the laser (e.g., a 308-nm UV pulsed 450W pulsed laser with low M-squared value is very different for the apparatus from a 1070-nm near IR 10 kW continuous wave laser with lower beam quality), the nature of the target plants, and the selected distance and elevation of the aircraft to the target area. That said, an embodiment of the apparatus using a 1470 nm wavelength, low M-squared value fiber laser or higher M-squared value direct diode laser stacked to several kW or possibly tens of kW operating from 800 meters from target and 300 meters above ground may lase several acres to several tens of acres per hour of opium poppy fields to prevent maturation of seed pods. For greater stealth and potentially greater safety from ground threats, the apparatus may be used at night and may selectively embody only non-visible wavelengths of laser. For less stealth and/or for more operating time per day the apparatus may also be used during the day and also be used with lasers in the visible range of the EM spectrum. Wavelength is selected on numerous criteria based on the specific application of the apparatus, importantly on distance requirements, atmospheric conditions and the target crop absorption spectra. Opium poppy plants, for example, have absorption peaks at wavelengths of 350-475 nm, around 670 nm, around 1470 nm, and around 1950 nm, which would be leading choices for apparatus laser wavelength for that plant. Within these leading choices, 670 nm may be selected against—or for—specifically because it is visible and if the objective for the apparatus is to be stealthy or alternatively to be blatant or because this is a wavelength that is also used for plant growth and therefore harder for those wishing to establish countermeasures to prevent while simultaneously allowing sunlight to reach the crop to grow it. Wavelengths of 1470 and 1950 nm may be selected because they penetrate deeper into the vegetation (as may be more appropriate for dense coca plants) and because they are in the "eye safe" region of IR. Or a wavelength in the range of 380-400 may be preferred because it diverges less in the atmosphere allowing for a more focused beam on target from farther away and scattering is not significant for the high and hot environment that the apparatus is intended to be used in a given situation. The specific atmospheric environment and vegetative target for a given need may influence the preferred wavelength and that may in turn have implications for the selected laser technology, cooling requirements, and other components and aspects of the apparatus.

Earlier discussion of the apparatus indicated it is intended to be used outside of small arms fire range, yet FIG. 4 illustrates an embodiment of the aircraft with ballistic armoring. This is because being outside of every possible ground-based threat—such as larger caliber vehicle-mounted weapons—is likely not feasible; therefore, ballistic armoring is sensible to further reduce threat to apparatus, aircraft and/or crew. An embodiment of the apparatus aircraft in an extremely hostile environment may include land-to-air guided missile countermeasures and systems such as chaff and flares.

In an embodiment with the appropriate authorization, the apparatus aircraft may be modified not only to lase target land areas of illicit crops, but also to include additional, distinct programming to respond to threats, using the apparatus as a weapon against those threats; as the apparatus aircraft may be operating with others in the vicinity, these apparatus aircraft may be programmed to share threat data and combine and coordinate in response raising the overall level of safety for crew, aircraft and/or apparatus. In such a situation, the aircraft may retreat to greater distances and/or circle the threat alone or with other apparatus aircraft to ensure multiple attack angles on the ground threat; the LiDAR and FLIR systems would provide key targeting information to, for example, concentrate lasing on disabling weapons and vehicles while avoiding potential maiming of people.

The preceding discussion is presented to enable a person skilled in the art to make and use the invention. Various modifications to the embodiments will be readily apparent to those skilled in the art, and the generic principles herein may be applied to other embodiments and applications without departing from the spirit and scope of the present invention. Thus, the present invention is not intended to be limited to the embodiments shown, but is to be accorded the widest scope consistent with the principles and features disclosed herein.

What is claimed is:

1. A mobile system for targeting and damaging at least one growing plant within a predetermined target area containing a first plurality of plants, the system comprising:
   a source configured to generate a beam of energy sufficient to damage at least one plant when the plant is exposed to the beam;
   an optical component operable to focus and direct the beam of energy generated by the source;
   a controller communicatively coupled to the source and optical component;
   the controller being configured to:
   identify the predetermined target area;
   access a first set of threat data relating to operator/system safety from land-based threats in or near the predetermined target area;
   determine, using the first set of threat data, whether or not at least one hostile action is expected in response to a first planned activity involving deployment of the system to damage the at least one growing plant within the predetermined target area;
   identify a first operating configuration to be utilized for carrying out the first planned activity if the at least one hostile action is not expected;
   identify a second operating configuration to be utilized for carrying out the first planned activity if the at least one hostile action is expected, wherein the second operating configuration is different from the first operating configuration;
   cause the system to execute the first planned activity using the first operating configuration in response to determining that the at least one hostile action is expected;

cause the system to execute the first planned activity using the second operating configuration in response to determining that the at least one hostile action is not expected;
identify a first object within the predetermined target area;
determine whether or not the first object corresponds to at least one plant to be damaged;
prevent the energy beam from reaching the first object in response to determining that the first object does not correspond to the at least one plant to be damaged; and
cause the energy beam to reach the first object in response to determining that the first object corresponds to the at least one plant to be damaged.

2. The system of claim 1:
wherein the first operating configuration defines a first set of parameters for executing the first planned activity, including:
a first flight path radius parameter specifying a first flight path radius value;
a first aircraft speed parameter specifying a first flight speed value;
a first energy beam wavelength parameter specifying a first energy beam wavelength value;
a first energy beam type parameter specifying a first energy beam type;
a first energy beam power parameter specifying a first energy beam power value.

3. The system of claim 2, wherein the second operating configuration defines a second set of parameters for executing the first planned activity, including:
a second flight path radius parameter specifying a second flight path radius value which is greater than the first flight path radius value;
a second aircraft speed parameter specifying a second flight speed value which is greater than the first flight speed value;
a second energy beam power parameter specifying a second energy beam power value which is greater than the first energy beam power value;
a second energy beam wavelength parameter specifying a second energy beam wavelength value; and
a second energy beam type parameter specifying a second energy beam type.

4. The system of claim 2 wherein the second operating configuration defines a second set of parameters for executing the first planned activity, including:
a second flight path radius parameter specifying a second flight path radius value which is greater than the first flight path radius value.

5. The system of claim 2 wherein the second operating configuration defines a second set of parameters for executing the first planned activity, including:
a second aircraft speed parameter specifying a second flight speed value which is greater than the first flight speed value.

6. The system of claim 2 wherein the second operating configuration defines a second set of parameters for executing the first planned activity, including:
a second energy beam power parameter specifying a second energy beam power value which is greater than the first energy beam power value.

7. The system of claim 3, wherein the second set of parameters further includes:
a second energy beam wavelength parameter specifying a second energy beam wavelength value which is different from the first energy beam wavelength value.

8. The system of claim 3, wherein the second set of parameters further includes:
a second energy beam type parameter specifying a second energy beam type which is different from the first energy beam type.

9. The system of claim 3 wherein:
in response to determining that the at least one hostile action is not expected, the controller is configured to cause the system to configure the first planned activity to be executed using the first set of parameters, including causing the system to:
configure a flight path radius parameter of the first planned activity utilizing the first flight path radius value;
configure an aircraft speed parameter of the first planned activity utilizing the first flight speed value;
configure an energy beam power parameter of the first planned activity utilizing the first energy beam power value;
in response to determining that the at least one hostile action is expected, the controller is configured to cause the system to configure the first planned activity to be executed using the second set of parameters, including causing the system to:
configure the flight path radius parameter of the first planned activity utilizing the second flight path radius value;
configure the aircraft speed parameter of the first planned activity utilizing the second flight speed value; and
configure the energy beam power parameter of the first planned activity utilizing the second energy beam power value.

10. The system of claim 1 further comprising:
a first sensor configured to sense infrared radiation emitted by an animal, and configured to generate thermal image data from the sensed radiation representing a thermal image of the animal;
first circuitry for comparing the thermal image data with data that represents a thermal image of a known animal;
the controller being further configured to:
cause the first sensor to continuously monitor the predetermined target area during execution of the first planned activity; and
analyze a first set of thermal image data relating to the first object; and
determine, using the first set of thermal image data, if the first object corresponds to an animal.

11. The system of claim 1 wherein the beam of energy is sufficient to critically damage the plant when the plant is exposed to the beam.

12. The system of claim 1 wherein the system is operable for deployment at a first aircraft during execution of the first planned activity; and
wherein the first aircraft corresponds to an aircraft selected from a first group comprising: a fixed wing aircraft, a rotatory wing aircraft, a lighter-than-air aircraft, and a helicopter.

13. The system of claim 3:
wherein the first flight path radius value is less than 350 meters from the first object; and
wherein the second flight path radius value is greater than 350 meters from the first object.

14. The system of claim 3:
wherein the first flight speed value is less than 45 knots; and
wherein the second flight speed value is greater than 45 knots.

15. The system of claim 3 wherein the second energy beam power value corresponds to a value which is sufficient to enable the energy beam to span a distance of at least 5,000 meters in the horizontal direction and at least 3,500 meters in the vertical direction.

16. The system of claim 3 wherein the second energy beam wavelength value corresponds to a non-visible wavelength.

17. The system of claim 1 wherein the source includes a laser operable to generate a beam of light having a wavelength of 532 nanometers.

18. The system of claim 1 wherein the optical component is operable to shape the beam of energy generated by the source.

19. The system of claim 1 wherein the optical component is operable to focus in a single dimension the beam of energy generated by the source.

20. The system of claim 1 further comprising:
a second sensor operable to sense a shape of the first object;
second circuitry operable to generate shape comparison data comparing the shape of the first object with a shape of a known object; and
the controller being further configured to use the shape comparison data in determining whether or not the first object corresponds to the at least one plant to be damaged.

21. The system of claim 1 further comprising:
a hyperspectral sensor operable to sense a signal from the first object and to generate output data that represents the sensed signal; and
circuitry operable to compare the output data with data that represents a known object.

22. The system of claim 1 further comprising:
a multispectral sensor operable to sense a signal from the first object and to generate output data that represents the sensed signal; and
circuitry operable to compare the output data with data that represents a known object.

23. The system of claim 1 further comprising:
a global positioning sensor operable to sense a location of the first object and to generate output data that represents the sensed location; and
circuitry operable to compare the output data with data that represents a known location.

24. A method for operating a system to target and damage at least one growing plant within a predetermined target area containing a first plurality of plants, the system including a source configured to generate a beam of energy sufficient to damage at least one plant when the plant is exposed to the beam; the system further including an optical component operable to focus and direct the beam of energy generated by the source; the system further including a controller communicatively coupled to the source and optical component; the method comprising causing the controller to execute a plurality of instructions to:
identify the predetermined target area;
access a first set of threat data relating to operator/system safety from land-based threats in or near the predetermined target area;
determine, using the first set of threat data, whether or not at least one hostile action is expected in response to a first planned activity involving deployment of the system to damage the at least one growing plant within the predetermined target area;
identify a first operating configuration to be utilized for carrying out the first planned activity if the at least one hostile action is not expected;
identify a second operating configuration to be utilized for carrying out the first planned activity if the at least one hostile action is expected, wherein the second operating configuration is different from the first operating configuration;
cause the system to execute the first planned activity using the first operating configuration in response to determining that the at least one hostile action is expected;
cause the system to execute the first planned activity using the second operating configuration in response to determining that the at least one hostile action is not expected;
identify a first object within the predetermined target area;
determine whether or not the first object corresponds to at least one plant to be damaged;
prevent the energy beam from reaching the first object in response to determining that the first object does not correspond to the at least one plant to be damaged; and
cause the energy beam to reach the first object in response to determining that the first object corresponds to the at least one plant to be damaged.

* * * * *